(12) United States Patent
Wei et al.

(10) Patent No.: US 11,982,405 B1
(45) Date of Patent: May 14, 2024

(54) STORAGE CONTAINER FOR LIQUEFIED GAS

(71) Applicant: SINOTECH ENERGY CO., LTD., Shanghai (CN)

(72) Inventors: Ying Wei, Shanghai (CN); Wei He, Shanghai (CN)

(73) Assignee: SINOTECH ENERGY CO., LTD., Shanghai (CN)

( * ) Notice: Subject to any disclaimer, the term of this patent is extended or adjusted under 35 U.S.C. 154(b) by 0 days.

(21) Appl. No.: 18/225,376

(22) Filed: Jul. 24, 2023

(30) Foreign Application Priority Data

Mar. 16, 2023 (CN) .......................... 202310254288.4

(51) Int. Cl.
F17C 1/00 (2006.01)

(52) U.S. Cl.
CPC ...... F17C 1/005 (2013.01); *F17C 2203/0612* (2013.01)

(58) Field of Classification Search
CPC .............. F17C 2270/0107; F17C 3/027; F17C 13/001; F17C 13/004; F17C 2221/033; F17C 2223/0153; F17C 1/005; F17C 2203/0612
See application file for complete search history.

(56) References Cited

U.S. PATENT DOCUMENTS

| | | | | |
|---|---|---|---|---|
| 2011/0056959 | A1* | 3/2011 | Haege | B60R 21/268 220/581 |
| 2015/0330569 | A1* | 11/2015 | Fitzpatrick | F17C 1/00 29/505 |
| 2016/0252214 | A1* | 9/2016 | Kanno | F17C 13/001 220/560.08 |
| 2023/0324005 | A1* | 10/2023 | Bergan | F17C 3/027 220/592.26 |

OTHER PUBLICATIONS

Apr. 27, 2023 Office Action issued in Chinese Patent Application No. 202310254288.4.
May 19, 2023 Decision to Grant a Patent issued in Chinese Patent Application No. 202310254288.4.
Mar. 16, 2023 Search Report issued in Chinese Patent Application No. 2023107784644.

* cited by examiner

*Primary Examiner* — Shawn M Braden
(74) *Attorney, Agent, or Firm* — Oliff PLC

(57) ABSTRACT

Disclosed is a storage container for liquefied gas, for example, a storage cabin for marine equipment such as ships. A bottom wall of a storage container includes a bottom wall sealing layer including a central section and at least one annular section. The annular section includes a plurality of first sealing plates and a plurality of second sealing plates, which are alternately arranged in a circumferential direction. The first sealing plates have a circumferential size gradually reduced in a radially inward direction, and the second sealing plates have a circumferential size gradually expanded in the radially inward direction. The sealing layer of the storage container of the present disclosure may be made of standard parts with regular shapes, without requiring special shaped segments, which is simple to process and saves materials. Further, sealing connectors serving as universal parts may also be used between adjacent standard parts, and some sealing connectors of the present disclosure also have certain thermal expansion and contraction, which can provide a certain amount of cold shrinkage deformation for the sealing layers.

26 Claims, 16 Drawing Sheets

STORAGE CONTAINER FOR LIQUEFIED GAS

TECHNICAL FIELD

The present disclosure relates to the field of chemical equipment, and particularly to a storage container for liquefied gas, for example, a liquefied gas storage cabin or container for marine equipment such as ships.

BACKGROUND

Liquefied natural gas (LNG) constantly serves as first-choice energy to substitute for petroleum due to its advantages of greenness, environment friendliness, and high efficiency, and becomes one of the fastest growing energy industries in the world. With the rapid development of China's economy and the continuous improvement of environmental governance requirements, the application and development of LNG has attracted more and more attentions, and the demand of the society for clean energy has increased rapidly. LNG is one of the critical directions for the future development of clean energy in China.

The composition of an LNG receiving station mainly includes wharf unloading, LNG storage, process treatment, and external transportation. An LNG storage tank undertaking a storage task has the longest construction period, the most advanced technology, and the most difficulties in a project construction process, and is always managed as a critical path of the entire project. Moreover, the construction form and technological innovation of the LNG storage tank are also the focus of attention from Chinese and international professionals in the industry.

In order to adapt to the plane of a thermal insulation structure, at present, the inner surface of the wall of a load-bearing structure for the LNG storage tanks is a regular polygon, and the bottom surface is approximately circular. In order to make each wall surface effectively sealed, the thermal insulation structure and metal shielding layer of each wall surface (especially the bottom surface) have more types of special parts, resulting in high machining, manufacturing, and assembly costs.

In addition, in the existing LNG storage tanks, L-shaped tabs are usually used to connect two metal plates with folded edges by welding to achieve sealing connection therebetween, so that each metal plate must be machined, which is cumbersome and costly.

Therefore, there is a need to provide a storage container for liquefied gas to at least partially solve the above problems.

SUMMARY

The present disclosure aims to provide a storage container for liquefied gas, such as a storage container for storing LNG. Sealing layers of the storage container may be made of standard parts with regular shapes, without requiring special shaped segments, and the standard parts can be simply cut from rectangular plates, which is simple to process and saves materials. The sealing layers of the present disclosure have good flatness, little damage to the structure of thermal insulation layers, and can reduce the influence of the sealing layers on the strength of a thermal insulation box. The structure of the sealing layers of the present disclosure is such that the sealing layers can be made thinner, so that an overall thermal conductivity of the storage container can be reduced to improve a heat preservation effect.

Further, sealing connectors serving as universal parts may also be used between adjacent standard parts, and some sealing connectors of the present disclosure also have certain thermal expansion and contraction, which can provide a certain amount of cold shrinkage deformation for the sealing layers. In addition, the use of the sealing connectors of the present disclosure does not require additional processing operations such as edge rolling on the sealing layer unit plate, which can improve the flatness of the sealing layers and ensure the sealing effect.

According to an aspect of the present disclosure, a storage container for liquefied gas is provided. The storage container includes a bottom wall and a side wall, where the bottom wall includes a bottom wall base layer and a bottom wall sealing layer covering a top side of the bottom wall base layer, and the bottom wall sealing layer includes:

a central section;
at least one annular section disposed around the central section, each of the at least one annular section including:
a plurality of first sealing plates and a plurality of second sealing plates which are alternately arranged in a circumferential direction, where the first sealing plates have a circumferential size gradually reduced in a radially inward direction, and the second sealing plates have a circumferential size gradually expanded in the radially inward direction; and
a first sealing connector disposed between and fixing the adjacent first sealing plate and second sealing plate on the bottom wall base layer.

In an implementation, at least two annular sections are provided and are arranged in an encircled manner in sequence. The bottom wall sealing layer further includes second sealing connectors disposed between adjacent annular sections and fix the adjacent annular sections on the bottom wall base layer.

In an implementation, all the first sealing plates in one annular section have the same shape and size, and all the second sealing plates in one annular section have the same shape and size.

In an implementation, the first sealing plates and the second sealing plates are formed into a sector shape, and are complementary in shape to jointly form an annular section with a uniform radial size.

In an implementation, each edge of the first sealing plate and the second sealing plate is a linear edge; or
the first sealing plate and/or the second sealing plate include(s) an arc-shaped edge; or
the first sealing plate and/or the second sealing plate include(s) a folded edge.

In an implementation, the sector shape has an innermost inner edge in a radial direction, an outermost outer edge in the radial direction, and a pair of side edges connected between the inner edge and the outer edge, where.
a pair of side edges of the first sealing plate are linear edges, and an inner edge and an outer edge of the first sealing plate are folded edges; and/or
a pair of side edges and an inner edge of the second sealing plate are linear edges, and an outer edge of the second sealing plate is a folded edge.

In an implementation, the pair of side edges of the first sealing plate are of unequal length, and included angles between the pair of side edges and the inner edge of the first sealing plate are unequal; and/or the pair of side edges of the second sealing plate are of equal length, and included angles between the pair of side edges and the inner edge of the second sealing plate are equal.

In an implementation, the first sealing plate is designed to satisfy:

$$\frac{(a-c)^2}{b^2} \in (0, 4),$$

where a is the length of the outer edge of the first sealing plate, c is the length of the inner edge of the first sealing plate, and b is the length of the pair of side edges of the first sealing plate.

In an implementation, the first sealing connector is a strip-shaped structure extending between the adjacent first sealing plate and the second sealing plate, and the first sealing connector includes a sink portion recessed towards a bottom side, and two lap-jointing hinges located on both sides of the sink portion and connected with the first sealing plate and the second sealing plate, respectively. A first accommodating groove is formed in the bottom wall base layer, and a sink portion body is embedded in the first accommodating groove.

In an implementation, the first accommodating groove has an inner cavity and an opening which is reduced relative to the inner cavity. The sink portion includes the sink portion body and thin necks connected between the body and the lap-jointing hinges, and the thin necks have a size adapted to pass through the opening, so that the sink portion body is embedded in the inner cavity.

In an implementation, there is a gap between the position where the lap-jointing hinge is connected with the thin neck and the bottom wall base layer, and/or a chamfer is disposed at the opening of the first accommodating groove.

In an implementation, the sink portion body is formed into a hollow structure, two ends of the first sealing connector extend out of the first accommodating groove, and the lap-jointing hinges at the two ends and the sink portion body are compressed in a height direction to form a fusion region. The fusion region has a top surface and a bottom surface which are horizontal planes.

In an implementation, the first sealing connector is compressed and deformed in a direction from its body portion to the fusion region and gradually rises upwards. The top and bottom surfaces of the first sealing connector between a start position and an end position of the compression and deformation are inclined planes, and the end of the fusion region forms a lap-jointing end for lap-jointing with the second sealing connector. The lap-jointing end has a top surface and a bottom surface which are horizontal planes.

In an implementation, the lap-jointing hinges have a consistent shape and size in a whole length direction of the first sealing connector.

In an implementation, the first sealing connector is configured to satisfy: tan $\theta \in [0.2, 0.4]$, where a section of an inner surface of a top wall of the sink portion is taken, and an included angle between the section and a plane where the bottom of the sink portion is located is $\theta$.

In an implementation, the first sealing connector is made of a dimpled plate; and/or
the first sealing connector has a cross section which is I-shaped or Q-Shaped.

In an implementation, the second sealing connector is a strip-shaped flat plate structure or a flat plate structure with a fold angle, a plurality of second sealing connectors are circumferentially arranged between each pair of adjacent annular sections, and the strip-shaped flat plate structures are respectively connected with the adjacent annular sections in a sealing manner.

In an implementation, there is a gap between the circumferentially adjacent second sealing connectors, and the gap is covered by a third sealing connector. The third sealing connector is simultaneously connected with two annular sections adjacent thereto and the second sealing connectors, and the third sealing connector is a lap-jointing plate.

In an implementation, the bottom wall sealing layer is formed into a regular polygon and divided into N rough sector regions, and the regular polygon is set to satisfy: Nsinφ/2π≥0.98, where φ is a central angle of each sector region.

In an implementation, the bottom wall base layer includes a central section formed into a regular polygon and a plurality of annular sections surrounding the central section and disposed in an encircled manner in sequence. Each annular section includes a plurality of trapezoidal base layer plates, and each base layer plate has a circumferential size gradually reduced in the radially inward direction.

In an implementation, the central section of the bottom wall sealing layer has a projected profile coinciding with a projected profile of the central section of the bottom wall base layer. A projected profile of the annular section of the bottom wall sealing layer deviates from a projected profile of the annular section of the bottom wall base layer. Projected profiles of the first sealing plate and the second sealing plate deviate from a projected profile of the base layer plate. In an implementation, a first accommodating groove for accommodating the first sealing connector is formed in a top surface of the base layer plate, and the first accommodating grooves of two radially adjacent base layer plates are aligned and extend along the same straight line. In addition, a second accommodating groove for accommodating the second sealing connector is formed at a radial center of the base layer plate, and the second accommodating groove has a depth set such that the second sealing connector is flush with the top surface of the base layer plate.

In an implementation, the side wall of the storage container includes a plurality of side wall units connected end to end in the circumferential direction. Each side wall unit includes a side wall base layer and a side wall sealing layer covering an inner surface of the side wall base layer. The side wall sealing layer includes a plurality of side wall sealing layer unit plates arranged in the circumferential direction, and adjacent side wall sealing layer unit plates are sealed and fixed on the side wall base layer by side wall sealing connectors. The side wall sealing connectors are strip-shaped structures extending between the adjacent side wall sealing layer unit plates.

In an implementation, the side wall sealing connector includes a flat plate structure accommodated in a corresponding recess formed on the side wall base layer. In addition, or alternatively, the side wall sealing connector includes a sink portion recessed towards the outside and two lap-jointing hinges located on both sides of the sink portion. The two lap-jointing hinges are connected with the side wall sealing layer unit plates adjacent thereto respectively, and the sink portion body is embedded in a corresponding recess formed on the side wall base layer.

In an implementation, the storage container includes a top wall, which includes a top wall base layer and a top wall sealing layer covering a bottom side of the top wall base layer. The top wall sealing layer includes:

a top wall central section;

at least one top wall annular section disposed around the top wall central section, each of the at least one top wall annular sections including:

a plurality of top wall first sealing plates and a plurality of top wall second sealing plates alternately arranged in the circumferential direction, where the top wall first sealing plates have a circumferential size gradually reduced in the radially inward direction, and the top wall second sealing plates have a circumferential size gradually expanded in the radially inward direction; and a top wall first sealing connector disposed between and fixing the adjacent top wall first sealing plate and top wall second sealing plate on the top wall base layer.

In an implementation, the storage container is a liquefied gas storage container for marine equipment or a land-based device for cryogenic frozen liquid.

BRIEF DESCRIPTION OF THE DRAWINGS

For a better understanding of above and other purposes, features, advantages, and functions of the present disclosure, reference may be made to preferable implementations shown in the drawings. The same reference numeral in the drawings denotes the same component.

Those skilled in the art should understand that the drawings are intended to schematically illustrate the preferable implementations of the present disclosure, without any limiting effect on the scope of the present disclosure, and various components in the figures are not drawn to scale.

REFERENCE NUMERALS

Figure 1:
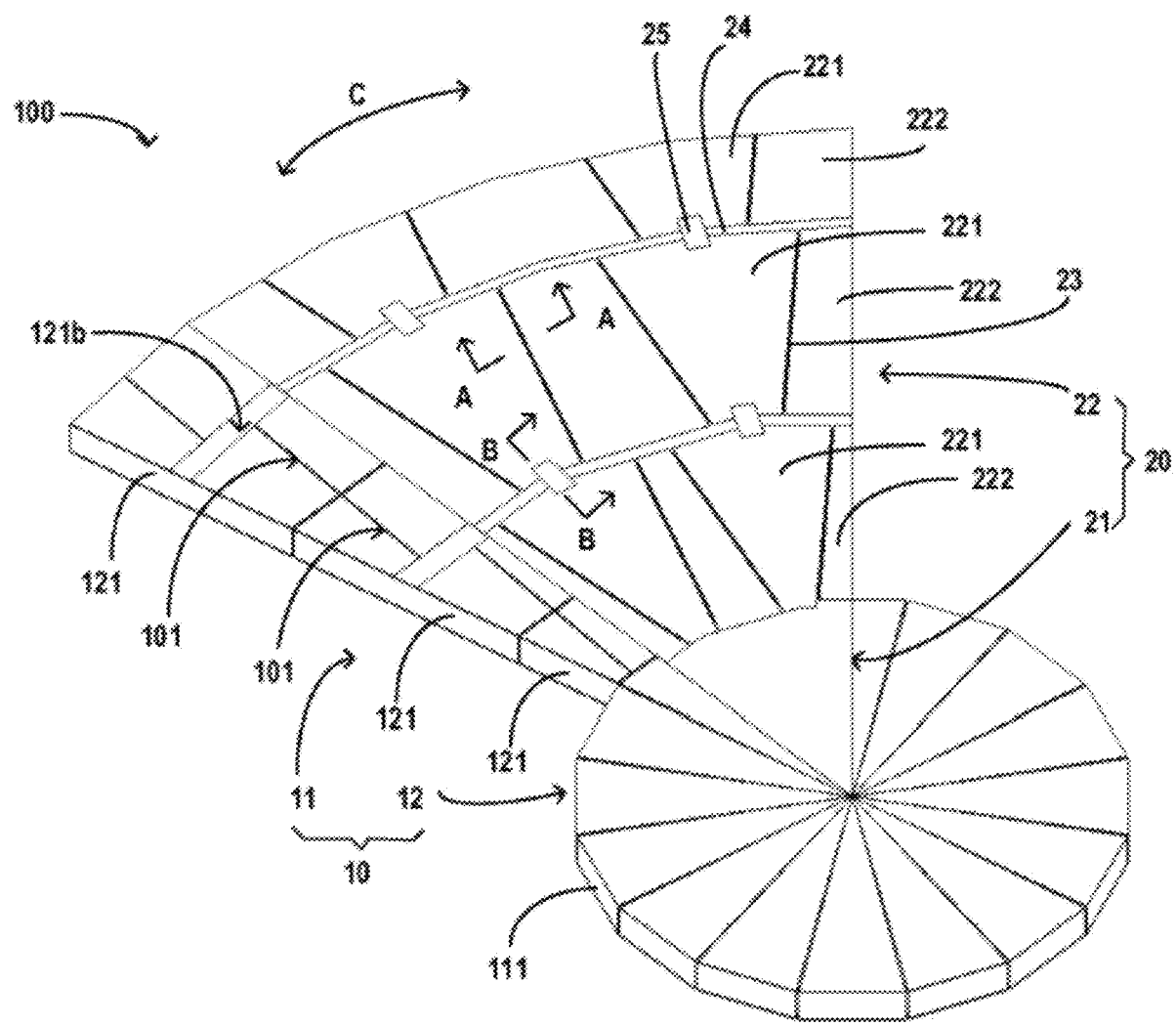
FIG. 1 is a partial top view of a bottom wall of a storage container according to a preferred implementation of the present disclosure.

100 Bottom wall
10 Bottom wall base layer
11 Annular section of the bottom wall base layer
111 Triangular plate
12 Central section of the bottom wall base layer
121 Base layer plate
101 First accommodating groove
101a Bottom wall of the first accommodating groove
101b Top wall of the first accommodating groove
101c Chamfer
121b Second accommodating groove
20 Bottom wall sealing layer
21 Central section of the bottom wall sealing layer
22 Annular section of the bottom wall sealing layer
22a First annular section
22b Second annular section
22c Third annular section
221 First sealing plate
221a Inner edge of the first sealing plate
221b Outer edge of the first sealing plate
221c Side edge of the first sealing plate
222 Second sealing plate
222a Inner edge of the second sealing plate
222b Outer edge of the second sealing plate
222c Side edge of the second sealing plate
23 First sealing connector
231 Sink portion
231a Top wall of the sink portion
231b Bottom wall of the sink portion
231c Attachment area
231d Outer end of the sink portion
232 Lap-jointing hinge
233 Thin neck
234 Transition region
234a Extension start portion
235a Extension end portion
235 Lap-jointing end
236 Fusion region
237 Lap-jointing undercut
24 Second sealing connector
25 Third sealing connector
200 Side wall
30 Side wall base layer
31 Fold-angle plate
32 Flat plate
40 Side wall sealing layer
41 Side wall sealing layer unit plate
42 First side wall sealing connector
43 Second side wall sealing connector
44 Third side wall sealing connector

DETAILED DESCRIPTION

The particular implementations of the present disclosure are described now in detail with reference to the drawings. Only preferable implementations of the present disclosure are described here, and those skilled in the art could conceive of other ways to implement the present disclosure based on the preferable implementations, which also fall within the scope of the present disclosure.

The present disclosure provides a storage container for liquefied gas, for example a storage container for storing LNG. FIGS. 1-12 show partial schematic views of a wall of a storage container according to a preferred implementation of the present disclosure.

It is to be noted first that, directional and positional terms as mentioned in the present disclosure are only illustrative descriptions rather than limiting descriptions, and may be understood with reference to positions, and orientations, etc. of various components shown in FIGS. 1-12. The description about a position of a component should be understood as a relative position rather than an absolute position, and the description about an extension direction of a component should be understood as a relative direction rather than an absolute direction.

For example, in the present disclosure, "inside" and "inward" may be understood as a side of a wall of the storage container accommodating liquefied gas and a direction towards the side accommodating the liquefied gas. "Outside" and "outward" refer to a side of the wall facing the outside and a direction facing the outside. "Bottom side" and "bottom surface" refer to a side facing a horizontal plane when the storage container is properly placed on the horizontal plane, that is, a downward side, which is shown by arrow D in the drawings. "Top side" and "top surface" refer to a side away from the horizontal plane when the storage container is properly placed on the horizontal plane, that is, an upward side, which is shown by arrow U in the drawings. "Circumferential direction" and "radial direction" refer to a circumferential direction and radial direction of a circumscribed circle of a circular or nearly circular regular polygon (including a shape similar to a regular polygon) formed by the bottom wall and the bottom wall sealing layer, where the circumferential direction is shown by arrow C in the drawings. "Radially inward" refers to a direction towards the center O of the bottom wall in the radial direction, which is shown by the arrow R1 in the drawing. "Radially outward" refers to a direction away from the center O of the bottom wall in the radial direction, which is shown by the arrow R2 in the drawing.

The storage container of the preferred implementations of the present disclosure includes a bottom wall 100 and a side wall surrounding the bottom wall 100 and extending towards a top side. The bottom wall 100 includes a bottom wall base layer 10 and a bottom wall sealing layer 20 covering a top side of the bottom wall base layer 10. The whole bottom wall 100 is formed into, for example, a regular polygonal plate structure. In order to clearly show the unit construction of the bottom wall base layer 10 and the bottom wall sealing layer 20, FIG. 1 shows only a part of the regular polygonal plate structure, and FIG. 2 shows a roughly complete structure of the bottom wall sealing layer 20.

Figure 2:
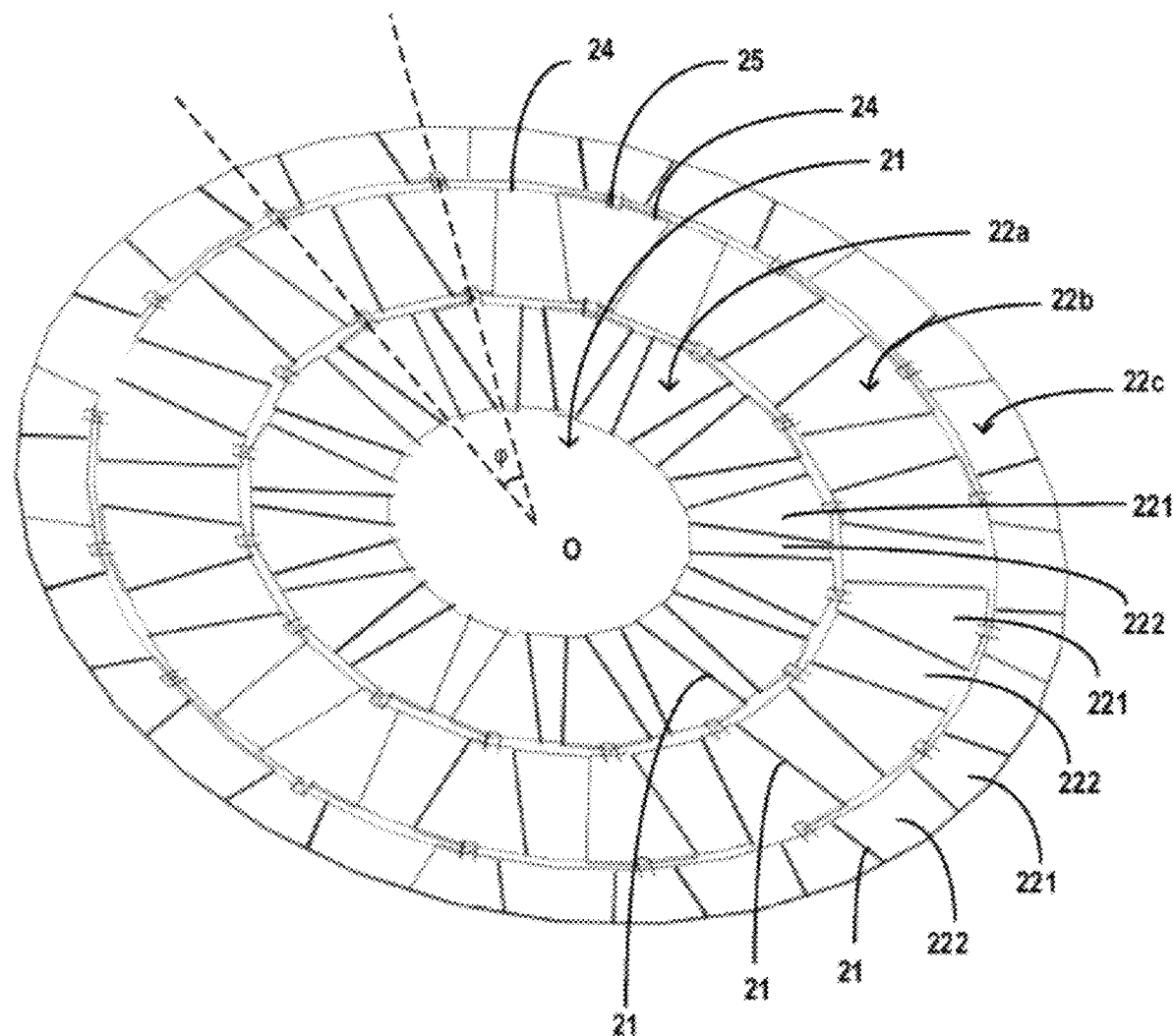
FIG. 2 is a top view of a roughly complete bottom wall sealing layer in this implementation.

Referring to FIGS. 1 and 2, the bottom wall sealing layer 20 includes a central section 21 and at least one annular section 22 disposed around the central section 21. Each annular section 22 includes a plurality of first sealing plates 221 and a plurality of second sealing plates 222, which are alternately arranged in the circumferential direction C. In the implementation shown in the figures, the bottom wall sealing layer 20 includes three annular sections 22, i.e., a first annular section 22a, a second annular section 22b and a third annular section 22c starting from the central section 21 as shown in FIG. 2, and the three annular sections 22 are disposed in an encircled manner in sequence. In other implementations, the bottom wall sealing layer 20 may include two, four or more annular sections 22. If the area of the central section 21 is not large, it may be also prefabricated integrally.

Each annular section 22 further includes first sealing connectors 23 and second sealing connectors 24. The first sealing connectors 23 are connected between adjacent first sealing plates 221 and second sealing plates 222 in each annular section 22 to realize sealing between the adjacent first sealing plates 221 and second sealing plates 222, and the adjacent first sealing plates 221 and second sealing plates 222 are fixed on the bottom wall base layer 10 through the first sealing connectors 23. The second sealing connectors 24 are connected between the adjacent annular sections 22 to achieve sealing between the adjacent annular sections 22, and the adjacent annular sections 22 are fixed on the bottom wall base layer 10 through the second sealing connectors 24. In an implementation, the second sealing connectors 24 are connected with the two annular sections 22 adjacent thereto in a sealing manner. For example, top surfaces of the second sealing connectors 24 can be in welded connection with the bottom surfaces of the two annular sections 22 adjacent thereto.

The first sealing plates 221 and the second sealing plates 222 are both formed into a sector shape, with a circumferential size of the first sealing plates 221 gradually reduced in a radially inward direction, and a circumferential size of the second sealing plates 222 gradually expanded in the radially inward direction. The first sealing plates 221 and the second sealing plates 222 are arranged alternately in the circumferential direction and are complementary in shape so as to form a complete annulus together which is uniform in width (i.e., the radial size) everywhere. It should be noted that the "sector shape" mentioned in the present disclosure represents a general shape, which may be, for example, a truncated sector shape or a shape similar to the truncated sector shape, and the shape similar to the truncated sector shape can have an arc contour line replaced by a straight contour line or a folded contour line. In an implementation, for a sector shape formed by the first sealing plate 221 or the second sealing plate 222, its innermost edge in the radial direction is called an inner edge, an outermost edge in the radial direction is called an outer edge, and a pair of side edges are connected between the inner edge and the outer edge.

Figure 3A:
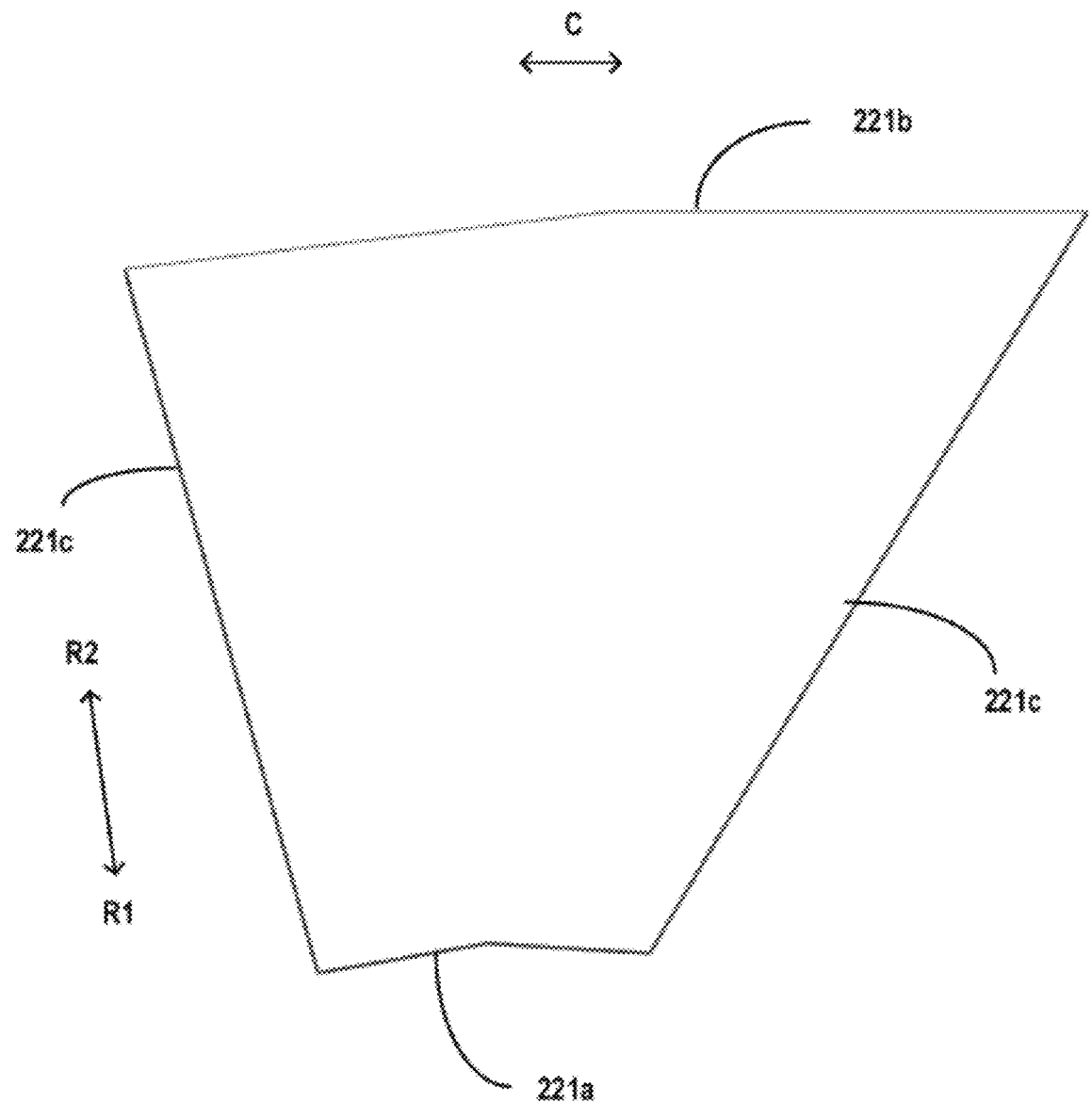
FIG. 3A is a top view of a separate first sealing plate in FIG. 2.
Figure 4:
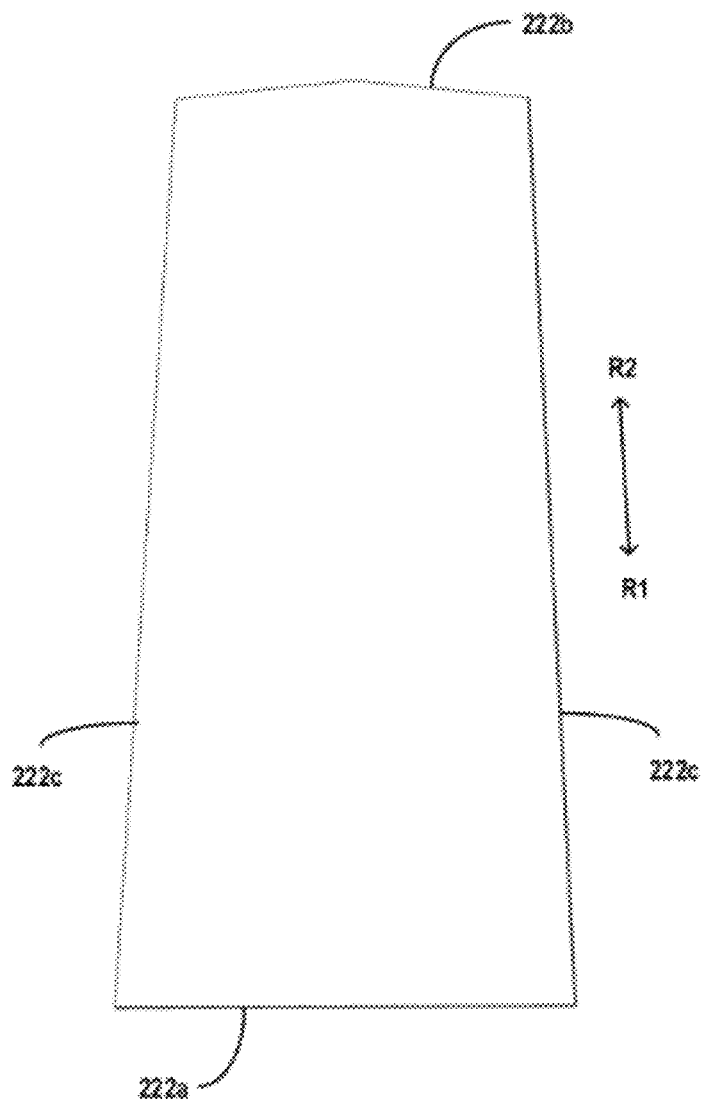
FIG. 4 is a top view of a separate second sealing plate in FIG. 2.

FIG. 3A shows a separate first sealing plate 221, and FIG. 4 shows a separate second sealing plate 222. The shapes of the first sealing plate 221 and the second sealing plate 222 will be described below in detail in conjunction with FIGS. 3A and 4.

First, referring to FIG. 3A, a pair of side edges of the first sealing plate 221 gradually converge in a direction towards the center of the bottom wall 100, so that the circumferential size of the first sealing plate 221 is gradually reduced along the radially inward R1 direction. The pair of side edges 221c of the first sealing plate 221 are straight edges, and an inner edge 221a and an outer edge 221b are folded edges. In this implementation, the pair of side edges 221c are of different length. In other implementations not shown, the inner edge and the outer edge of the first sealing plate may be arc-shaped edges or linear edges, and the pair of side edges may be of equal length. As can be seen from FIG. 3A, the first sealing plate 221 resembles a truncated sector as well.

Referring to FIG. 4, a pair of side edges of the second sealing plate 222 gradually move away from each other in a direction towards the center of the bottom wall 100, so that a circumferential size of the second sealing plate 222 is gradually expanded along the radially inward direction. In other words, the circumferential size of the second sealing plate 222 is gradually reduced along the radially outward R2 direction. The pair of side edges 222c and an inner edge 222a of the second sealing plate 222 are linear edges, and an outer edge 222b is a folded edge. Included angles formed between the pair of side edges 222c and the inner edge 222a are equal, and the pair of side edges 222c are of approximately equal length. As can be seen from FIG. 4, the second sealing plate 222 resembles an isosceles trapezoid as well. In other implementations not shown, the inner edge and the outer edge of the second sealing plate may be arc-shaped edges or linear edges, and the pair of side edges may be of unequal length.

The first sealing plate 221 and the second sealing plate 222 may be standard parts. In an implementation, all the first sealing plates 221 in any of the annular sections 22 may have identical shape and size, and can be produced from the same blank and by the same processing procedures. All the second sealing plates 222 in any of the annular sections 22 may have identical shape and size, and can be produced from the same blank and by the same processing procedures. For example, the first sealing plates 221 and the second sealing plates 222 may be cut from a rectangular blank.

Figure 3B:
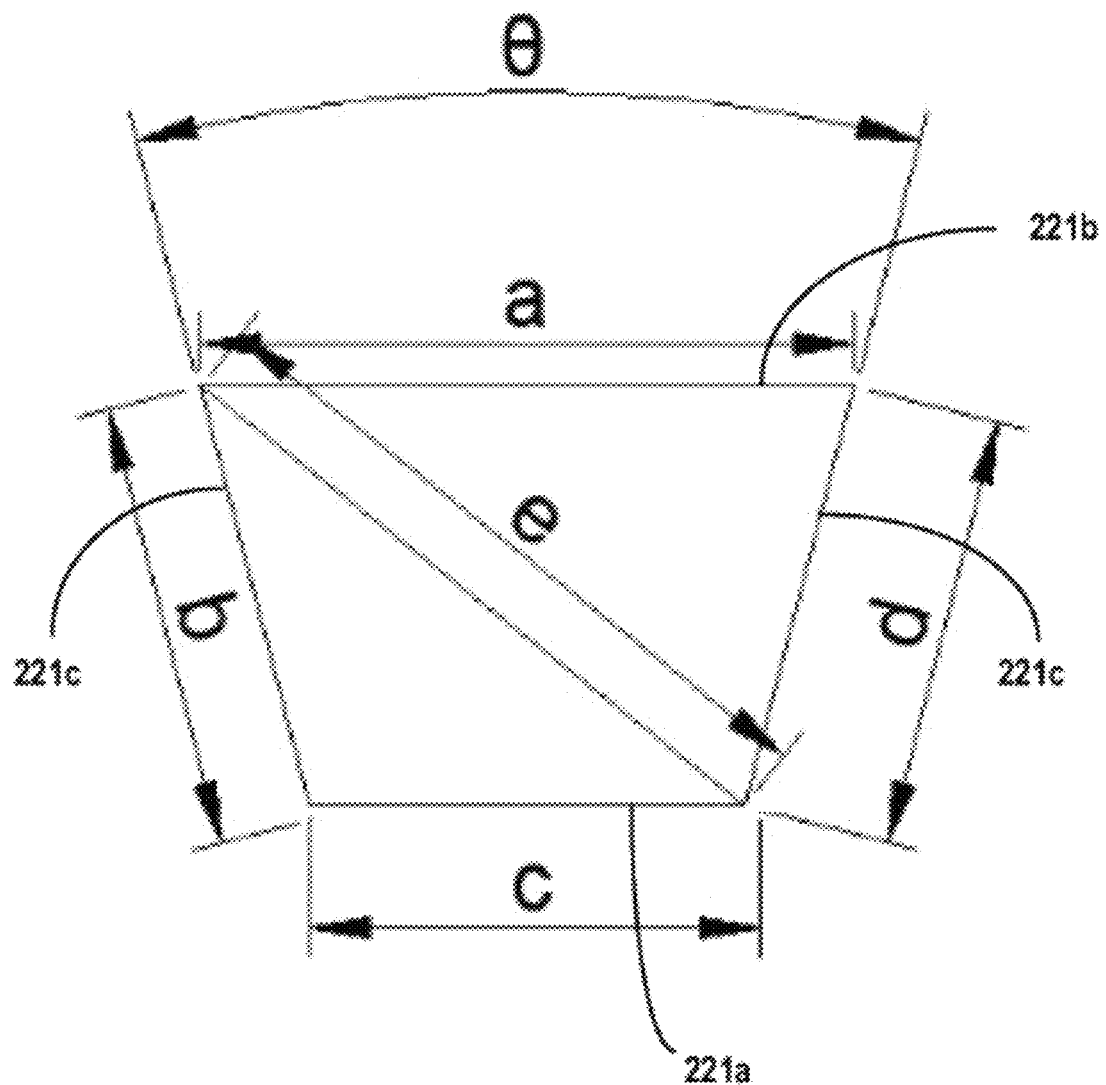
FIG. 3B is a top view of another possible separate first sealing plate or second sealing plate.

Turning back to FIG. 3B, another possible form of the first sealing plate will be described. The first sealing plate in FIG. 3B is designed to satisfy:

$$\frac{(a-c)^2}{b^2} \in (0, 4),$$

where a is the length of the outer edge of the first sealing plate, c is the length of the inner edge of the first sealing plate, b and d are lengths of the pair of side edges of the first sealing plate and can be equal, e is a diagonal length of the first sealing plate, and θ is a corresponding central angle of the first sealing plate. The central angle refers to a central angle corresponding to a roughly truncated sector formed by the first sealing plate. The form of the first sealing plate in FIG. 3B may also be applied to the second sealing plate, and when it is applied to the second sealing plate, the sizes of the inner edge and the outer edge are reversed.

Figure 5:
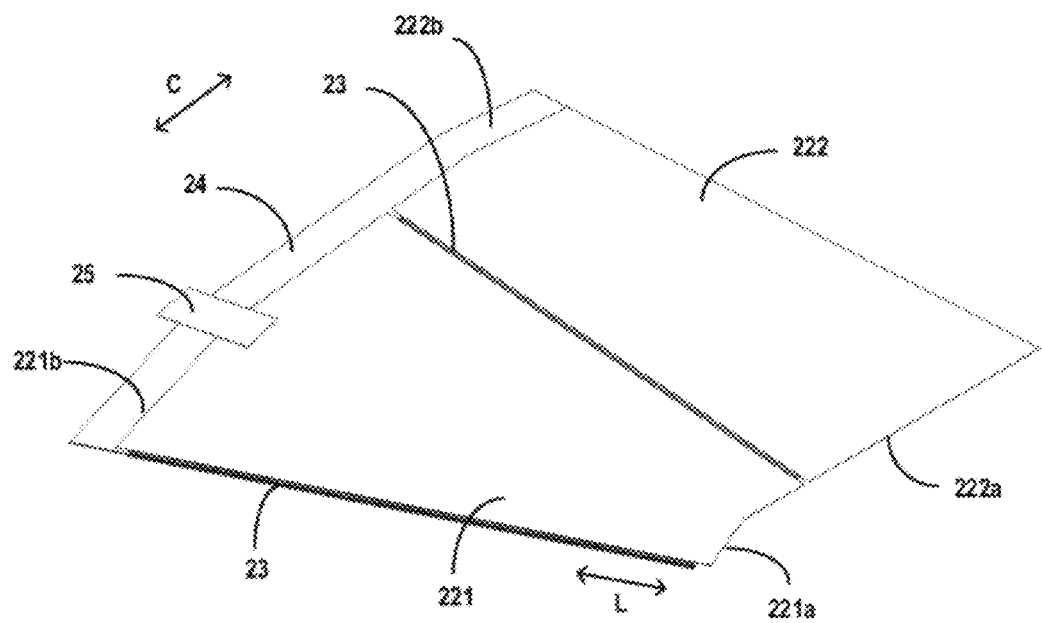
FIG. 5 is a view showing connection of the first sealing plate, the second sealing plate, a first sealing connector, a second sealing connector and a third sealing connector in FIG. 2.

FIG. 5 shows a separate view of a first sealing plate 221, a separate second sealing plate 222, as well as first sealing connectors 23 and a second sealing connector 24 in an assembled state. Referring to FIG. 5, the first sealing connectors 23 are strip-shaped structures extending between the adjacent first sealing plates 221 and second sealing plates 222, with one of the first sealing connectors 23 extending in a direction L. Only one first sealing connector 23 may be disposed between each pair of adjacent first sealing plate 221 and second sealing plate 222.

The second sealing connector 24 is a strip-shaped structure extending between two adjacent annular sections 22, and a plurality of second sealing connectors 24 arranged circumferentially may be disposed between the two adjacent annular sections 22 with a gap being present between adjacent second sealing connectors 24. A third sealing connector 25 may be disposed at the gap. The third sealing connector 25 may be of a patch-shaped structure, which is connected with the two second sealing connector 24 adjacent thereto and two annular sections 22 adjacent thereto at the same time, so as to achieve sealing here. FIGS. 6-8D schematically show a configuration and an installation state of the first sealing connector 23, and FIG. 9 shows an installation state of the second sealing connector 24 and the third sealing connector 25. Installation methods of the first sealing connector 23, the second sealing connector 24 and the third sealing connector 25 will be described below in conjunction with the drawings.

Figure 6:
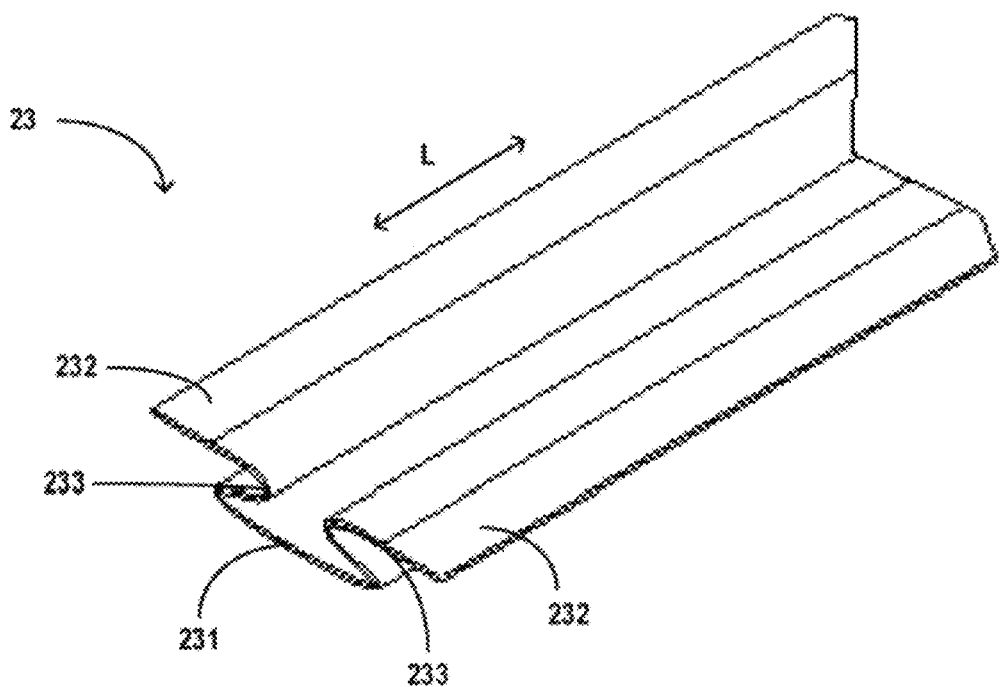
FIG. 6 is a perspective view of the first sealing connector in FIG. 5.
Figure 7A:
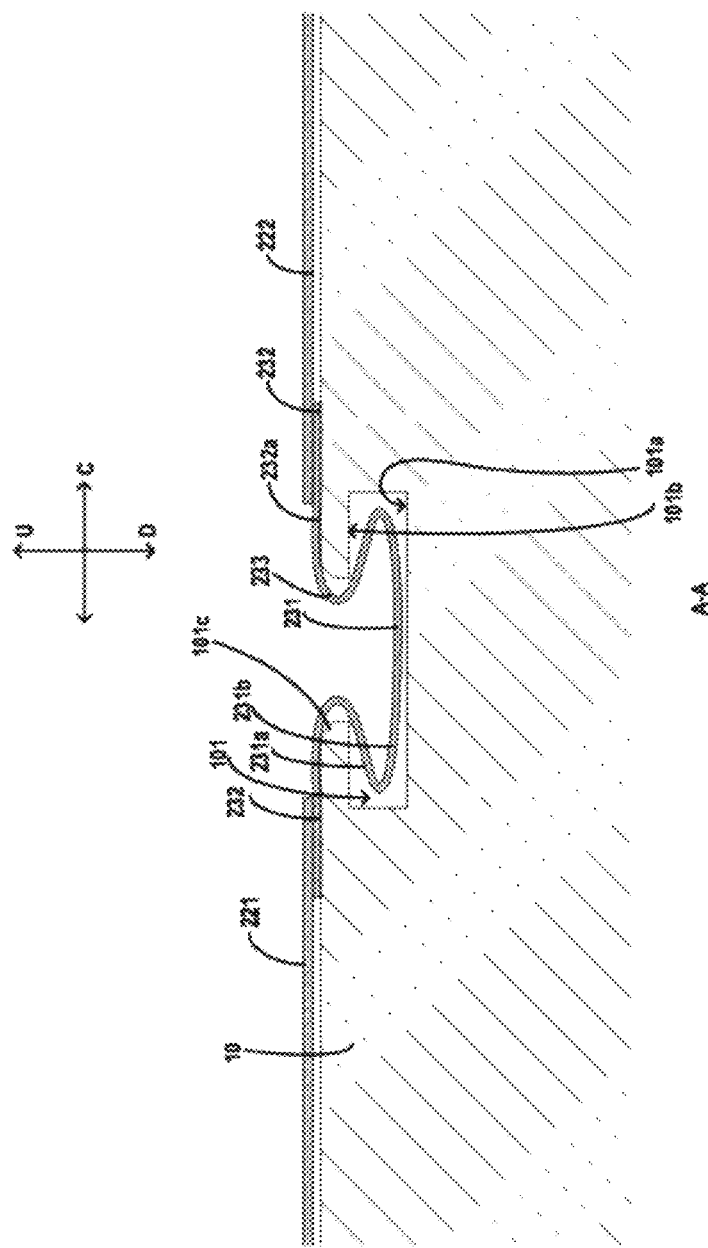
FIG. 7A is a cross-sectional view taken along line A-A in FIG. 1.

The first sealing connector 23 has a unique configuration, which is shown in FIGS. 6 and 7A. The arrow L in the figure shows an overall extension direction of the first sealing connector 23. In an implementation, the first sealing connector 23 includes a sink portion 231 recessed towards a bottom side and two lap-jointing hinges 232 located on both sides of the sink portion 231, and the two lap-jointing hinges 232 are connected to the first sealing plate 221 and the second sealing plate 222, respectively. A first accommodating groove 101 is formed in the bottom wall base layer 10, and a body of the sink portion 231 is embedded in the first accommodating groove 101. In an implementation, the first accommodating groove 101 has an inner cavity and an opening which is reduced relative to the inner cavity, and a bottom surface 101a and a top surface 101b of the inner cavity are parallel to a top surface of the bottom wall base layer 10. The sink portion 231 and the lap-jointing hinges 232 are connected by thin necks 233 which have a size adapted to pass through the opening, so that the sink portion 231 is embedded in the inner cavity and cannot be detached from the first accommodating groove 101.

Further, with continued reference to FIG. 7A, there is a slight gap between the position where the lap-jointing hinge 232 is connected with the thin neck 233 and the bottom wall base layer 10, and the lap-jointing hinge 232 forms a bridging structure at this gap. Circumferential ends of the lap-jointing hinges 232 are closely attached to the top surface of the bottom wall base layer 10, and the first sealing plate 221 and the second sealing plate 222 are welded and fixed on top surfaces of the circumferential ends of the lap-jointing hinges 232 respectively. The opening of the first accommodating groove 101 is provided with a chamfer 101c which can play a guiding role, so as to facilitate entry of the first sealing connector 23 to the first accommodating groove 101 in a roughly radial direction.

Figure 7B:
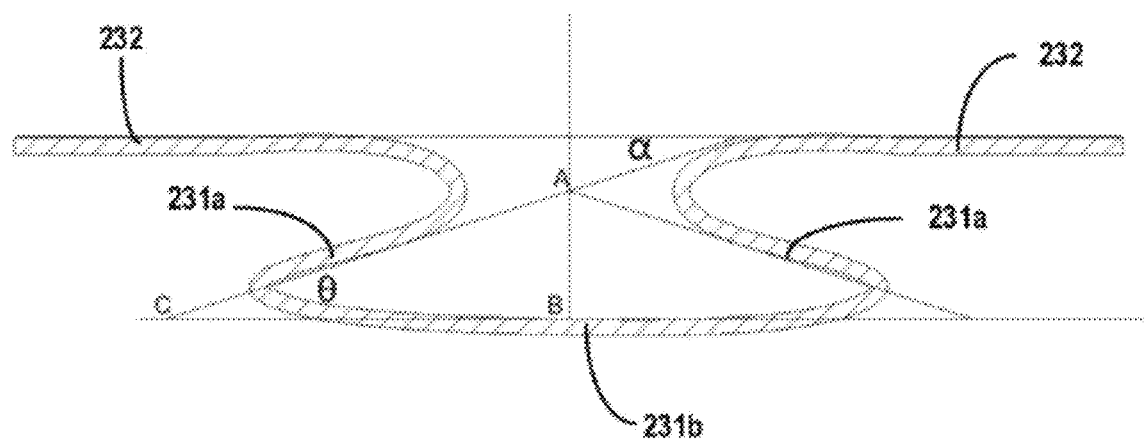
FIG. 7B is a cross-sectional view of the separate first sealing connector in FIG. 7A.

The sink portion 231 is formed into a roughly jar-shaped hollow structure with an open top. Referring to FIG. 7B, a cross-sectional shape of the first sealing connector is configured to satisfy: tan θ∈[0.2,0.4]. In FIG. 7B, a section of an inner surface of a top wall of the sink portion is taken, where an intersection point between the section and a vertical center line of the sink portion is A, bottom center of the sink portion is B, an intersection point of the section and a plane where the bottom of the sink portion is located is C, an included angle between the section and the plane where the bottom of the sink portion is located is θ, and a thickness of the first sealing connector is d. Due to actual bending errors, ∠α≠∠θ.

Figure 8A:
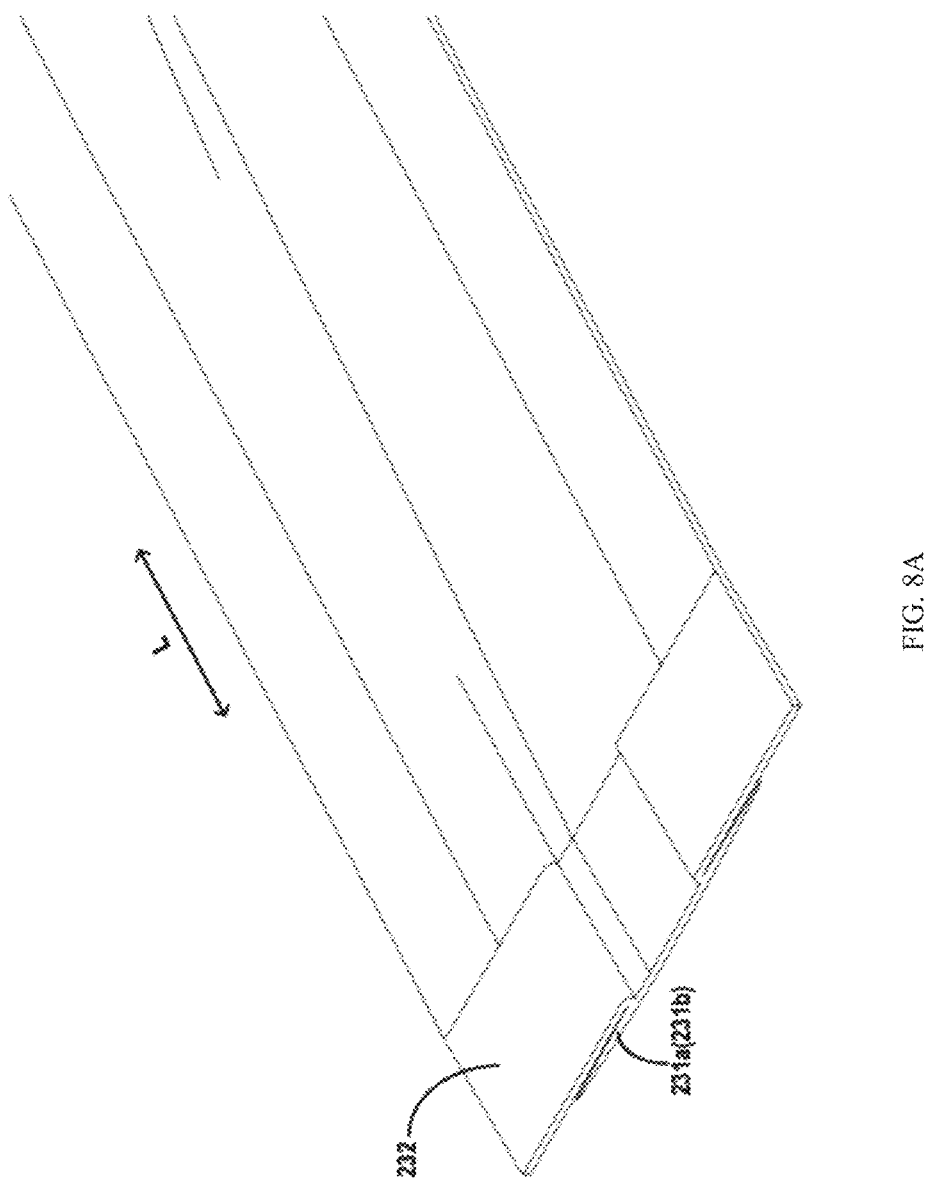
FIG. 8A is a perspective view of an end of the first sealing connector in FIG. 5.
Figure 9:
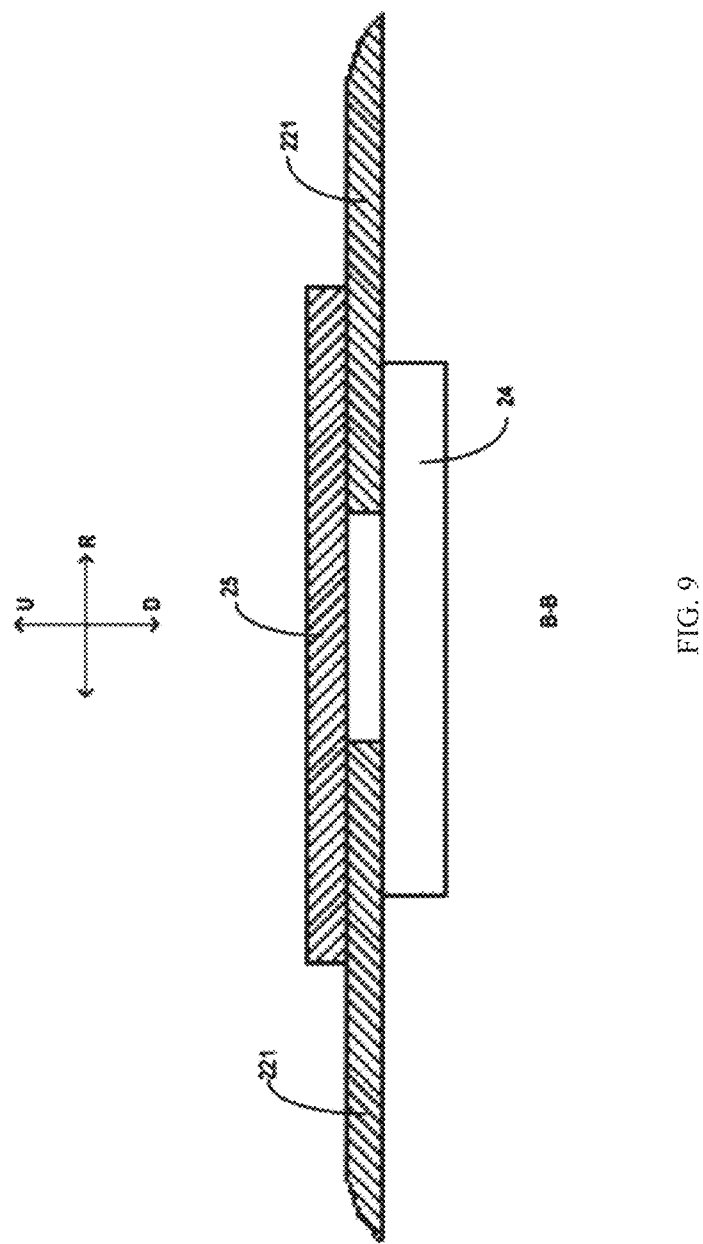
FIG. 9 is a cross-sectional view taken along line B-B in FIG. 1.

When the first sealing connector is assembled into the first accommodating groove 101, both ends of the first sealing connector 23 extend out of the first accommodating groove 101 (not shown in FIG. 6) and are flattened using a process, such that the lap-jointing hinges 232 at both ends, the top walls 231a of the sink portion 231 and a bottom wall 231b of the sink portion 231 are compressed in a height direction, which is shown in FIG. 8A. Both flattened ends of the first sealing connector 23 are lap-jointed and fixed on the second sealing connectors 24.

Figure 8B:
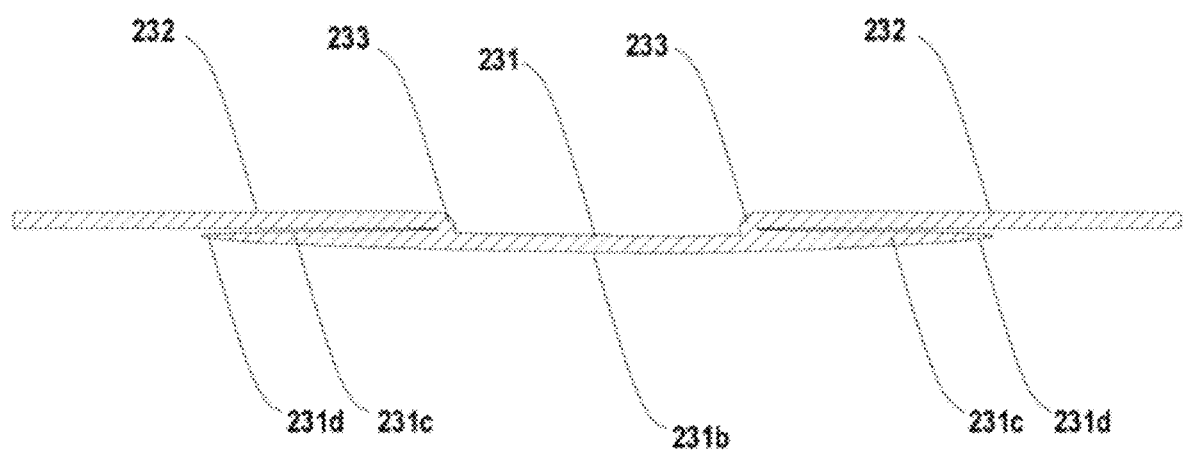
FIG. 8B is a cross-sectional view of the end of the first sealing connector in FIG. 8A.
Figure 8C:
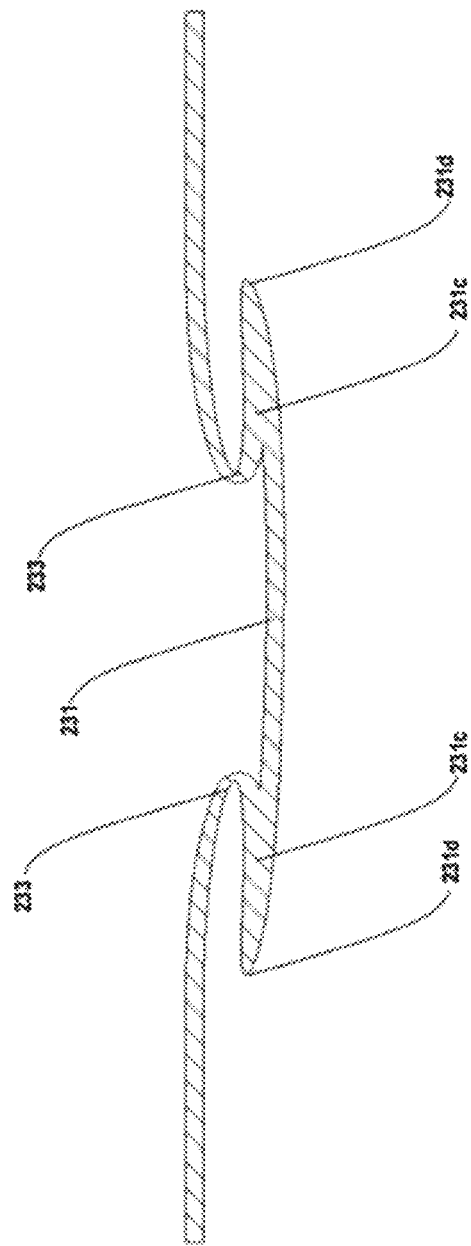
FIG. 8C is a cross-sectional view of the end of the first sealing connector in FIG. 8B as presented in the process of being flattened.

With continued reference to FIGS. 8B-8C, during the extension of a body 231 of the first sealing connector 23, the thin neck 233 gradually shrinks inward, and the top wall 231a and the bottom wall 231b of the sink portion which define a fusion region gradually get close and are attached to form an attachment area 231c, and the fusion region gradually becomes thinner. During this process, outer ends 231d of the sink portion gradually protrude outward due to extrusion of a material in the fusion region.

Figure 8D:
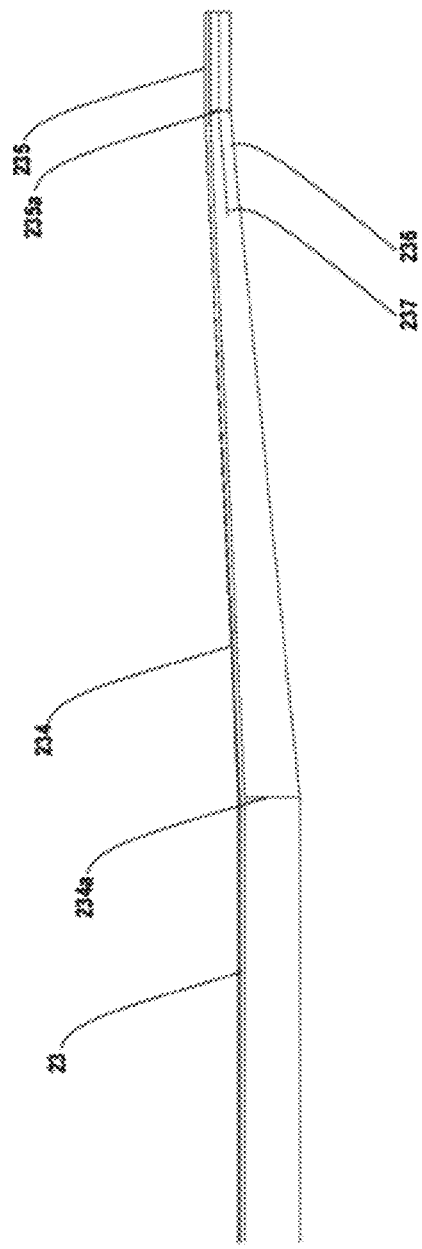
FIG. 8D is a side view of a first sealing connector.

Referring to FIG. 8D, as can be seen from the side view, the first sealing connector starts to be gradually extended, compressed and deformed from an extension start portion 234a.

The body of the first sealing connector gradually changes from the extension start portion 234a to an extension end portion 235a, and this gradually changed area is called a transition region 234. Throughout the extension deformation process, starting from an lap-jointing undercut 237, the bottom wall of the sink portion, the top wall of the sink portion, the lap-jointing hinge at the top of the sink portion, and the thin neck will be compressed into the fusion region 236, and a straight line where the lap-jointing undercut 237 is located is a compressed plane edge, and the deformation of the fusion region 236 will continue until the extension end portion 235a. Throughout the deformation process of the first sealing connector from the extension start portion 234a to the extension end portion 235a, the lap-jointing hinge only changes in position during the deformation process, and its own shape does not change. The body of the first sealing connector is connected to a lap-jointing end 235 through the extension end portion 235a, and a lower bottom surface of a lap-jointed overlapping area formed by the lap-jointing end 235 is directly lap-jointed with a corner plate (i.e., the second sealing connector). The second sealing connector may be also referred to as an anchoring sealing slat or an engaging seal.

As can be seen from FIG. 8D, the first sealing connector gradually rises upward from its body portion towards the fusion region. A transition region is formed between the body portion and the fusion region, and top and bottom surfaces of the transition region are inclined planes.

In an implementation, the first sealing connector 23 may be made of a dimpled plate. The first sealing connector 23 can compensate for the deformation of the bottom wall sealing layer 20 caused by a temperature. For example, the first sealing connector 23 can absorb the load associated with the shrinkage of the sealing layer when the storage container accommodates a low-temperature liquid, so that the bottom wall sealing layer 20 can remain stable and less likely to break at different operating temperatures. In some implementations, the first sealing connector has a cross section which may be I-shaped or Ω-Shaped.

Compared with the existing L-shaped tab structure for connecting two sealing plates, the first sealing connectors 23 of the present disclosure are symmetrically distributed as a whole, and the two symmetrical lap-jointing hinges 232 are each welded with one sealing plate, so that the first sealing connector 23 is circumferentially subjected to stress in two opposite directions, and the whole first sealing connector 23 substantially remains in a static state in the storage container. Through the first sealing connector 23, the first sealing plate 221 and the second sealing plate 222 are firmly fixed on the bottom wall base layer 10. In addition, because the first sealing connector 23 with special configuration is used in the present disclosure, the first sealing plate 221 and the second sealing plate 222 do not need to be bent, thus reducing a processing step. At the same time, the first sealing connector 23 may also allow a user to adapt to the change in an actual use size by changing a lap-jointing distance.

FIG. 9 shows an installation state of the second sealing connector 24 and the third sealing connector 25. The second sealing connector 24 is fixed on the bottom wall base layer 10. In an implementation, the bottom wall base layer 10 may be provided with a second accommodating groove 121b for accommodating the second sealing connector 24 (the bottom wall base layer not shown in FIG. 9), and the second accommodating groove 121b has a depth set such that a top surface of the second sealing connector 24 is flush with the top surface of the bottom wall base layer 10. The second sealing connector 24 may be screwed or riveted to the bottom wall base layer 10 after being placed in the second accommodating groove 121b. There is a gap between adjacent second sealing connectors 24, and the patch-shaped third sealing connector 25 is installed on the top surfaces of the adjacent second sealing connectors to fill the gap. Because there is a height difference between the top surface of the second sealing connector 24 and the top surface of the first sealing plate 221, the third sealing connector 25 need to be knocked down at a position above the gap during assembly to make a pressure shoulder, so as to be closely attached with the second sealing connector 24 and the first sealing plate 221. After the second sealing connector 24 is installed on the bottom wall base layer 10 and the third sealing connector 25 is installed between the adjacent second sealing connectors 24, the first sealing plate 221 and the second sealing plate 222 are installed (for example, welded) between the adjacent second sealing connectors 24 such that both radial ends of the first sealing plate 221 and the second sealing plate 222 are connected with the second sealing connectors 24 respectively.

To sum up, referring back to FIG. 2, it can be seen that the adjacent first sealing plate 221 and second sealing plate 222 in each annular section 22 of the bottom wall sealing layer 20 are connected and sealed by the first sealing connector 23. Adjacent annular sections 22 are connected and sealed by the second sealing connectors 24. Circumferentially adjacent second sealing connectors 24 are connected and sealed by the third sealing connectors 25. The annular sections 22 are disposed in an encircled manner in sequence from the central section 21. The central section 21, the first sealing plates 221, the second sealing plates 222, the first sealing connectors 23, the second sealing connectors 24, and the third sealing connectors 25 are fixed to each other by welding or otherwise, to form the complete bottom wall sealing layer 20 shown in FIG. 2.

In an implementation not shown, the first sealing connector and the second sealing connector may be replaced with each other. For example, the first sealing connector may be disposed between the adjacent annular sections, and the second sealing connector may be disposed between the adjacent first sealing plate and second sealing plate in each annular section.

With continued reference to FIG. 2, the central section 21 is, for example, a regular polygon. The bottom wall sealing layer 20 is also formed into a regular polygon with a larger number of sides, so that the regular polygon is very close to its circumscribed circle in shape. In an implementation, the bottom wall sealing layer 20 has an area S set to be ≥0.98S1, where S1 is the area of the circumscribed circle of the regular polygon.

Further, the bottom wall sealing layer 20 may be divided into a plurality of sector regions, with boundary lines of one sector region being shown by dotted lines in FIG. 2. One boundary line of the sector region coincides with a roughly central line of one first sealing plate 221 extending in the radial direction, and the other boundary line of the sector region coincides with a roughly central line of another first sealing plate 221 extending in the radial direction, with only one second sealing plate 222 sandwiched between the two first sealing plates 221. An included angle between the two boundary lines of the sector region is φ, and the bottom wall sealing layer 20 may be divided into N such rough sector regions. The regular polygon has many sides, and is therefore very close to a circle, so it can be obtained that $\varphi=2\pi/N$. For one such rough sector region, its actual area is $$r\cos\frac{\varphi}{2}r\sin\frac{\varphi}{2},$$

where r is the radius of the circumscribed circle of the roughly sector region. The actual area of the regular polygon is $$Nr\cos\frac{\varphi}{2}r\sin\frac{\varphi}{2} = \frac{Nr^2\sin\varphi}{2}.$$

As mentioned above, in an implementation, the actual area is set to be greater than 98% of the area of the circumscribed circle, that is, $Nr^2 \sin\varphi/2 \geq 0.98\eta^2$, obtaining $N\sin\varphi/2\pi \geq 0.98$.

In some implementations, the annular sections may be laid from the outside to the inside, so that the error of the end of each sector region will be concentrated in the central section. In this case, the central section can be an ordinary polygon instead of a regular polygon, which has the function of compensating for a length tolerance and a small part of an angular tolerance, and can reduce the number of special components for field cutting.

In addition to the above preferred settings for the bottom wall sealing layer 20, in some implementations, the bottom wall base layer 10 may also have some special preferred settings. For example, turning back to FIG. 1, the bottom wall base layer 10 may also include a central section 12 formed into a regular polygon and a plurality of annular sections 11 surrounding the central section 12 and disposed in an encircled manner in sequence. Each annular section 11 includes a plurality of base layer plates 121 formed into the shape of an isosceles trapezoid, and each base layer plate 121 has a circumferential size gradually reduced in the radially inward direction. That is to say, legs of the isosceles trapezoid extend roughly along the radial direction, and an upper base and a lower base of the isosceles trapezoid extend roughly along the circumferential direction. In an implementation, the central section 12 of the bottom wall base layer 10 is formed by a plurality of triangular plates 111 arranged around the center O of the bottom wall 100 in sequence.

With continued reference to FIG. 1, the central section 21 of the bottom wall sealing layer 20 has a projected profile coinciding with a projected profile of the central section 12 of the bottom wall base layer 10, and both the projected profiles of the central section 21 and the central section 12 are regular polygons which are approximately circular. The annular section 22 of the bottom wall sealing layer 20 has a projected profile not coinciding with a projected profile of the annular section 11 of the bottom wall base layer 10, so that gaps between the adjacent annular sections 22 are staggered from gaps between the adjacent annular sections 11. Projected profiles of the first sealing plate 221 and the second sealing plate 222 do not coincide with projected profiles of the base layer plates, so that gaps between the adjacent sealing plates are staggered from gaps between the adjacent base layer plates. In conjunction with the drawings, it can be understood that the above "projected profile" refers to a projected profile of a component on a horizontal plane. A pair of radially adjacent bottom wall base layers 10 are shown in detail in FIG. 10.

Figure 10:
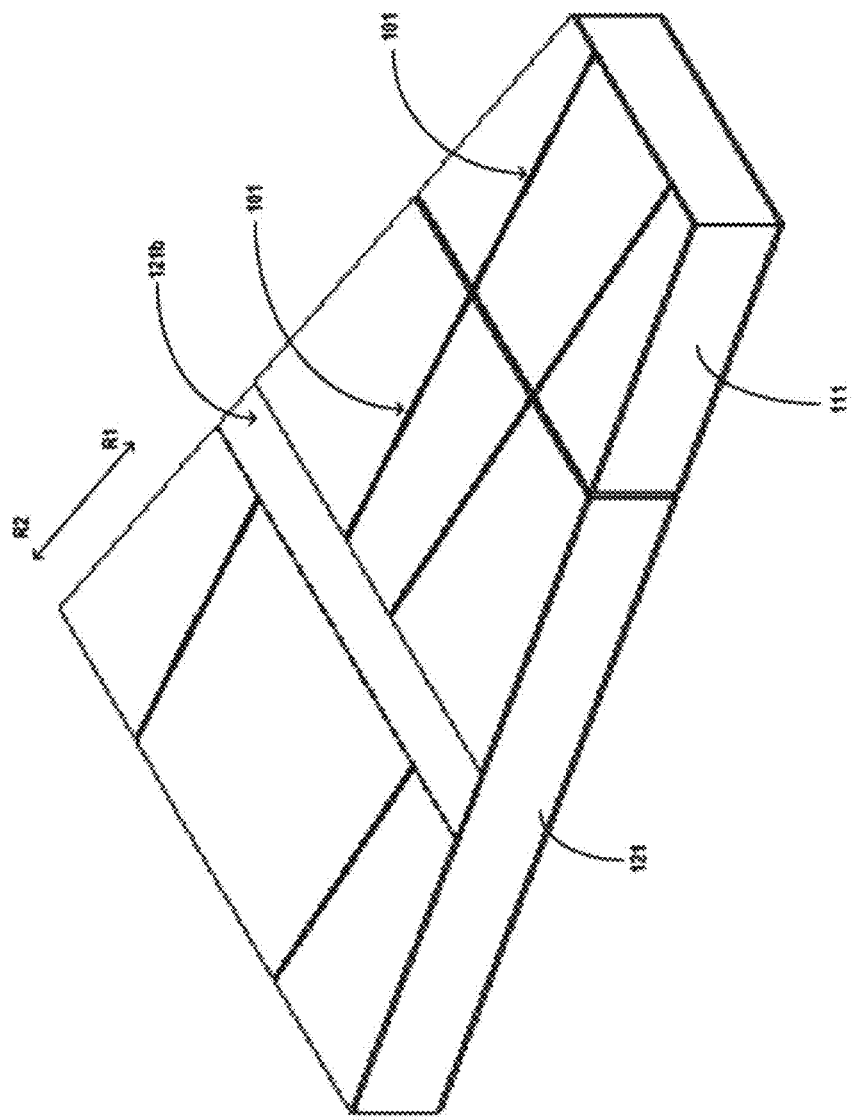
FIG. 10 is a partial perspective view of a bottom wall base layer in FIG. 1.

Referring to FIGS. 1 and 10, the base layer plate is provided with the first accommodating groove 101 as mentioned above for accommodating the first sealing connector 23 of the bottom wall sealing layer 20. In an implementation, the first accommodating grooves 101 of two radially adjacent base layer plates extend collinearly to jointly accommodate one first sealing connector 23, so that the first sealing connector 23 extends on the surfaces of the two adjacent base layer plates of the bottom wall base layer 10. At least part of the base layer plate is provided with the second accommodating groove 121*b* for accommodating the second sealing connector 24 as mentioned above, and the second accommodating groove 121*b* may be disposed, for example, at a radially central position of the base layer plate. It can be understood that the second accommodating grooves 121*b* of two or more circumferentially adjacent base layer plates are aligned with each other to jointly accommodate one second sealing connector 24. In an implementation, the depth of the second accommodating groove 121*b* is set such that the second sealing connector 24 is flush with the top surfaces of the base layer plates.

In the above implementation, the bottom wall base layer 10 is an insulation layer, which is made of, for example, plywood. The bottom wall sealing layer 20 may be made of, for example, a metal. The first sealing plate 221 and the second sealing plate 222 in the bottom wall sealing layer 20 may be made of thin metal plates, and the second sealing connector 24 may be made of, for example, a thick metal plate.

In some implementations, a top wall of the storage container may also have a structure similar to that of the bottom wall. The top wall may include a top wall base layer and a top wall sealing layer on a bottom surface of the top wall. The top wall sealing layer and the bottom wall sealing layer have the same or similar structure, and the top wall base layer and the bottom wall base layer have the same or similar structure. The above description of the bottom wall base layer and the bottom wall sealing layer should be also considered as a description of the top wall base layer and the top wall sealing layer of the present disclosure.

Figure 11:
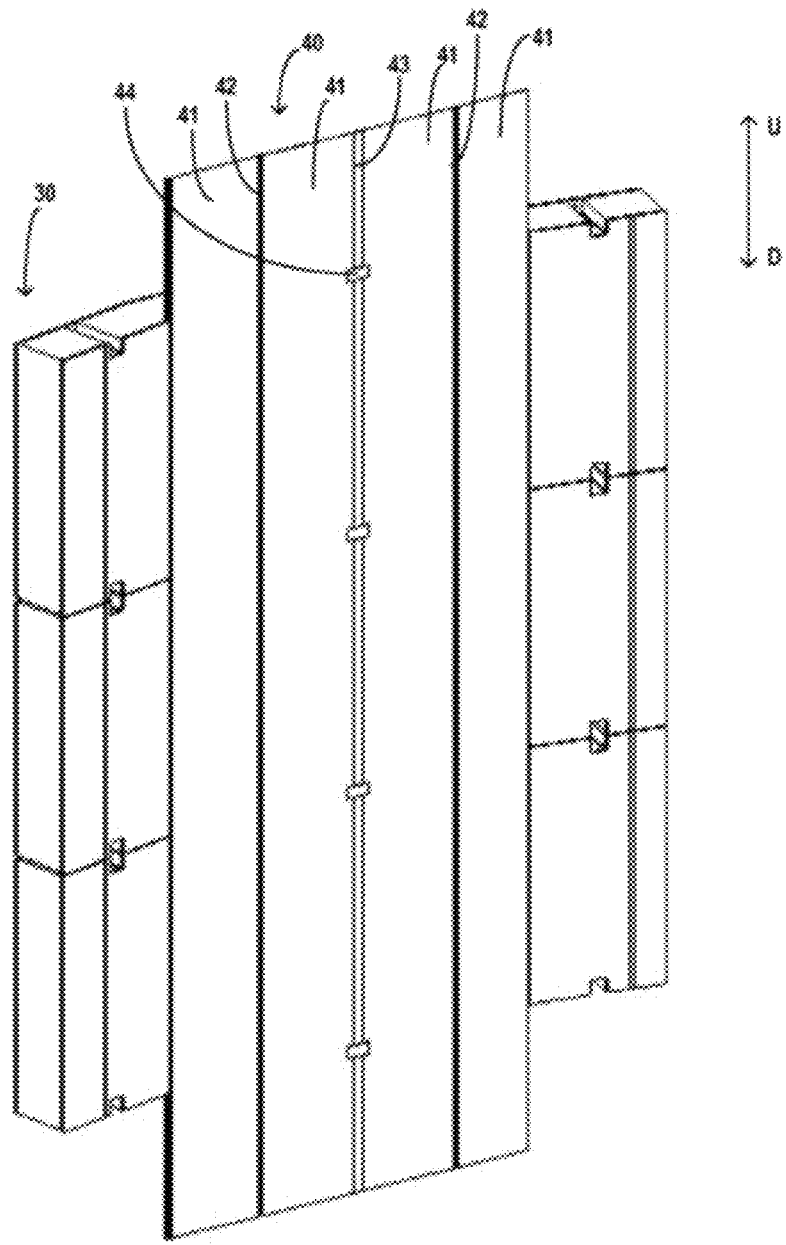
FIG. 11 is a partial perspective view of a side wall of the storage container in the preferred implementation.
Figure 12:
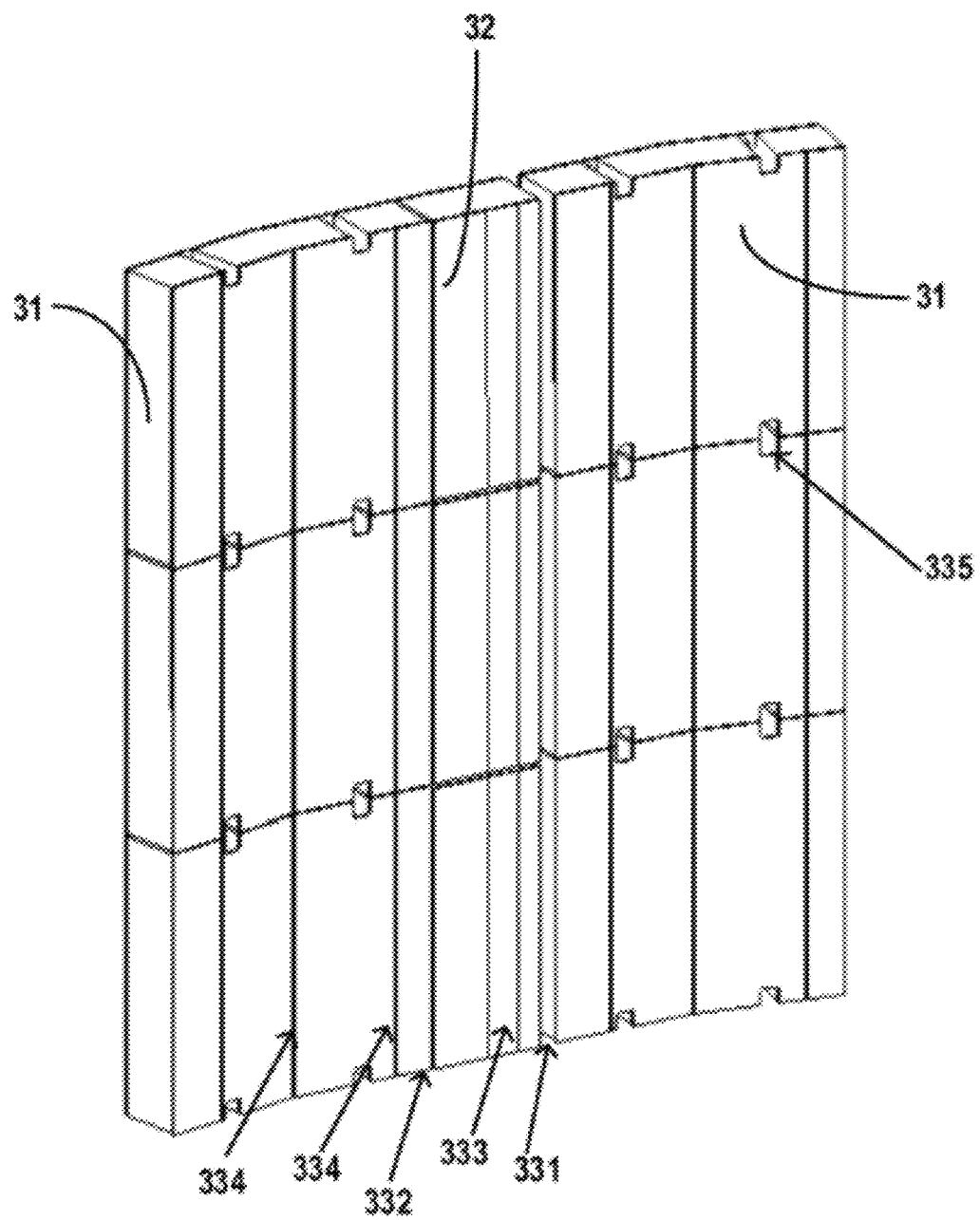
FIG. 12 is a schematic view of a separate side wall base layer in FIG. 11.

With continued reference to FIGS. 11 and 12, in some implementations, some particularly preferred settings may also be made for a side wall 200 of the storage container. The side wall 200 of the storage container includes a plurality of side wall units connected end to end in the circumferential direction, and the number of the side wall units may be equal to, for example, the number of sides of the regular polygon of the bottom wall 100. Each side wall unit includes a side wall base layer 30 and a side wall sealing layer 40 covering an inner surface of the side wall base layer 30. The side wall sealing layer 40 includes a plurality of side wall sealing layer unit plates 41 arranged in the circumferential direction, and the adjacent side wall sealing layer unit plates 41 are sealed and fixed on the side wall base layer 30 by side wall sealing connectors. The side wall sealing connectors are strip-shaped structures extending between the adjacent side wall sealing layer unit plates 41.

The side wall sealing connector may include a sealing connector which is the same as or similar to the first sealing connector 23, for example, a first side wall sealing connector 42. In an implementation, the first side wall sealing connector 42 includes a sink portion recessed towards the outside and two lap-jointing hinges located on both sides of the sink portion. The two lap-jointing hinges are connected with the adjacent side wall sealing layer unit plates respectively, and the sink portion is embedded in a corresponding recess formed in the side wall base layer, for example, a first side wall accommodating groove 334. Likewise, the side wall sealing connector may include a flat plate structure which is the same as or similar to the second sealing connector 24, and is therefore called a second side wall sealing connector 43. The second side wall sealing connector 43 is accommodated in a corresponding recess formed in the side wall base layer 30, for example, a second side wall accommodating groove 333. A third side wall sealing connector 44 may be further included to fill a gap between the adjacent second side wall sealing connectors 43 in a height direction.

Referring to FIG. 12, for each side wall base layer 30, it may include two kinds of plates, i.e., a flat plate 32 and a fold-angle plate 31. One flat plate 32 and one fold-angle plate 31 are closely arranged in the circumferential direction C to form a fixed unit together, and a plurality of fixed units are stacked in height. In one fixed unit, a gap 332 between the flat plate 32 and the fold-angle plate 31 has a width of a fixed value, while a gap 331 between the adjacent fixed units in the circumferential direction has a width of a variable value, allowing a certain amount of compensation for the actual use size (for example, to adapt to the size of an outer wall as described later). Each gap is filled with a thermal insulation material. In some implementations, the first side wall accommodating groove 334 may be disposed on the fold-angle plate 31, and the second side wall accommodating groove 333 may be disposed on the flat plate 32.

In fact, in addition to the above-mentioned side wall, the storage container may be additionally provided with an outer wall, so that the plates of the side wall base layer 30 can be directly adhered to the outer wall. The outer wall is made of, for example, cement, and the side wall base layers 30 may be made of, for example, plywood or other materials. Slot holes 335 formed in the side wall base layer 30 are used to fix the side wall base layer 30 to the outer wall.

In the above implementation, the side wall base layer 30 is an insulation layer, which is made of, for example, plywood. The side wall sealing layer 40 may be made of, for example, a metal. The side wall base layer 30 and the side wall sealing layer 40 may include multi-layer structures respectively, and the plurality of side wall base layers 30 and the plurality of side wall sealing layers 40 may be disposed alternately.

As can be seen from the above implementations, the sealing layers of the storage container of the present disclosure may be made of standard parts with regular shapes, without requiring special shaped segments, and the standard parts can be simply cut from rectangular plates, which is simple to process and saves materials. The sealing layers of the present disclosure have good flatness, little damage to the structure of the thermal insulation layers, and can reduce the influence of the sealing layers on the strength of a thermal insulation box. The structure of the sealing layers of the present disclosure is such that the sealing layers can be made thinner, so that an overall thermal conductivity of the storage container can be reduced to improve a heat preservation effect. Further, sealing connectors serving as universal parts may also be used between adjacent standard parts, and some sealing connectors of the present disclosure also have certain thermal expansion and contraction, which can provide a certain amount of cold shrinkage deformation for the sealing layers. In addition, the use of the sealing connectors of the present disclosure does not require additional processing operations such as edge rolling on the sealing layer unit plate, which can improve the flatness of the sealing layers and ensure the sealing effect. The bottom wall sealing layer has no raised portions, so that the thermal insulation layer laid on the sealing layer does not need to be slotted on the back, which improves the structural strength of the thermal insulation layer. The storage container of the present disclosure is a liquefied gas storage container for marine equipment or a land-based device for cryogenic frozen liquid.

The above description of various implementations of the present disclosure is provided for the purpose of description to a person of ordinary skill in the relevant art. It is not intended to make the present disclosure exclusive or limitative to a single disclosed implementation. As above, a person of ordinary skill in the art as taught above will understand various substitutions and variations of the present disclosure. Therefore, although some alternative implementations are described in detail, a person of ordinary skill in the art will understand or relatively easily develop other implementations. The present disclosure is intended to include all substitutions, modifications, and variations of the present disclosure as described herein, as well as other implementations falling within the spirit and scope of the present disclosure as described above.

What is claimed is:

1. A storage container for liquefied gas, comprising a bottom wall and a side wall, wherein the bottom wall comprises a bottom wall base layer and a bottom wall sealing layer covering a top side of the bottom wall base layer, and wherein the bottom wall sealing layer comprises:
   a central section;
   at least one annular section disposed around the central section, each of the at least one annular section comprising:
      a plurality of first sealing plates and a plurality of second sealing plates, which are alternately arranged in a circumferential direction, wherein the first sealing plates have a circumferential size gradually reduced in a radially inward direction, and the second sealing plates have a circumferential size gradually expanded in the radially inward direction; and
   first sealing connectors arranged between and fixing the adjacent first sealing plates and second sealing plates on the bottom wall base layer.

2. The storage container of claim 1, wherein at least two annular sections are provided and are arranged in an encircled manner in sequence, and the bottom wall sealing layer further comprises second sealing connectors disposed between the adjacent annular sections and fixing the adjacent annular sections on the bottom wall base layer.

3. The storage container of claim 2, wherein all the first sealing plates in any one of the annular sections have the same shape and size, and all the second sealing plates in any one of the annular sections have the same shape and size.

4. The storage container of claim 2, wherein the first sealing plate and the second sealing plate are formed into a sector shape, and are complementary in shape to jointly form an annular section with a uniform radial size.

5. The storage container of claim 4, wherein each edge of the first sealing plates and the second sealing plates is a linear edge; or
   the first sealing plate and/or the second sealing plate comprise an arc-shaped edge; or
   the first sealing plate and/or the second sealing plate comprise a folded edge.

6. The storage container of claim 4, wherein the sector shape has an innermost inner edge in a radial direction, an outermost outer edge in the radial direction, and a pair of side edges connected between the inner edge and the outer edge, wherein:

a pair of side edges of the first sealing plate are linear edges, and an inner edge and an outer edge of the first sealing plate are folded edges; and/or a pair of side edges and an inner edge of the second sealing plate are linear edges, and an outer edge of the second sealing plate is a folded edge.

7. The storage container of claim 6, wherein the pair of side edges of the first sealing plate are of unequal length, and included angles between the pair of side edges and the inner edge of the first sealing plate are unequal; and/or the pair of side edges of the second sealing plate are of equal length, and included angles between the pair of side edges and the inner edge of the second sealing plate are equal.

8. The storage container of claim 7, wherein the first sealing plate is designed to satisfy:

$$\frac{(a-c)^2}{b^2} \in (0, 4),$$

wherein a is the length of the outer edge of the first sealing plate, c is the length of the inner edge of the first sealing plate, and b is the length of the pair of side edges of the first sealing plate.

9. The storage container of claim 1, wherein the first sealing connector is a strip-shaped structure extending between the adjacent first sealing plate and second sealing plate, the first sealing connector comprises a sink portion recessed towards a bottom side, and two lap-jointing hinges located on both sides of the sink portion and connected with the first sealing plate and the second sealing plate respectively, a first accommodating groove is formed in the bottom wall base layer, and the sink portion is embedded in the first accommodating groove.

10. The storage container of claim 9, wherein the first accommodating groove has an inner cavity and an opening which is reduced relative to the inner cavity, and the sink portion and the lap-jointing hinges are connected by thin necks which have a size adapted to pass through the opening, so that the sink portion is embedded in the inner cavity.

11. The storage container of claim 10, wherein a gap exists between a position where the lap-jointing hinge is connected with the thin neck and the bottom wall base layer, and/or a chamfer is disposed at the opening of the first accommodating groove.

12. The storage container of claim 9, wherein the sink portion is formed into a hollow structure, two ends of the first sealing connector extend out of the first containing groove, and the lap-jointing hinges at both ends and the sink portion are compressed in a height direction to form a fusion region, with a top surface and a bottom surface of the fusion region being horizontal planes.

13. The storage container of claim 12, wherein the first sealing connector is compressed and deformed in a direction from a body portion of the first sealing connector towards the fusion region and gradually rises upwards, the top surface and bottom surface of the first sealing connector between a starting position and an ending position of the compression and deformation are inclined planes, the end of the fusion region forms a lap-jointing end for lap-jointing with the second sealing connector, and the lap-jointing end has a top surface and a bottom surface which are both horizontal planes.

14. The storage container of claim 12, wherein the lap-jointing hinges have a consistent shape and size in a whole length direction of the first sealing connector.

15. The storage container of claim 12, wherein the first sealing connector is configured to satisfy: $\tan\theta \in [0.2, 0.4]$, wherein a section of an inner surface of a top wall of the sink portion is taken, and an included angle between the section and a plane where the bottom of the sink portion is located is $\theta$.

16. The storage container of claim 9, wherein the first sealing connector is made of a dimpled plate; and/or the first sealing connector has a cross section which is I-shaped or $\Omega$-Shaped.

17. The storage container of claim 1, wherein the second sealing connector is a strip-shaped flat plate structure or a flat plate structure with a fold angle, a plurality of the second sealing connectors are circumferentially arranged between each pair of adjacent annular sections, and the second sealing connectors are connected with the adjacent annular sections in a sealing manner respectively.

18. The storage container of claim 17, wherein a gap exists between the circumferentially adjacent second sealing connectors and is covered by a third sealing connector, the third sealing connector is simultaneously connected with the two annular sections adjacent thereto and the second sealing connector, and the third sealing connector is a lap-jointing plate.

19. The storage container of claim 1, wherein the bottom wall sealing layer is formed into a regular polygon and divided into N rough sector regions, and the regular polygon is set to satisfy: $N\sin\varphi/2\pi \geq 0.98$, where $\varphi$ is a central angle of each sector region.

20. The storage container of claim 1, wherein the bottom wall base layer comprises a central section formed into a regular polygon and a plurality of annular sections surrounding the central section and disposed in an encircled manner in sequence, wherein each annular section comprises a plurality of trapezoidal base layer plates each having a circumferential size gradually reduced in the radially inward direction.

21. The storage container of claim 20, wherein the central section of the bottom wall sealing layer has a projected profile coinciding with a projected profile of the central section of the bottom wall base layer; a projected profile of the annular section of the bottom wall sealing layer deviates from a projected profile of the annular section of the bottom wall base layer; and projected profiles of the first sealing plate and the second sealing plate deviate from a projected profile of the base layer plate.

22. The storage container of claim 21, wherein a first accommodating groove for accommodating the first sealing connector is formed in a top surface of the base layer plate, the first accommodating grooves of the two radially adjacent base layer plates are aligned and extend along the same straight line, a second accommodating groove for accommodating the second sealing connector is formed at a radial center of the base layer plate, and the second accommodating groove has a depth set such that the second sealing connector is flush with the top surface of the base layer plate.

23. The storage container of claim 1, wherein the side wall of the storage container comprises a plurality of side wall units connected end to end in the circumferential direction, each side wall unit comprises a side wall base layer and a side wall sealing layer covering an inner surface of the side wall base layer, the side wall sealing layer comprises a plurality of side wall sealing layer unit plates arranged in the circumferential direction, the adjacent side wall sealing layer unit plates are sealed and fixed on the side wall base layer by side wall sealing connectors, and the side wall sealing connectors are strip-shaped structures extending between the adjacent side wall sealing layer unit plates.

24. The storage container of claim 23, wherein the side wall sealing connector comprise a flat plate structure accommodated in a corresponding recess formed in the side wall base layer; and/or, the side wall sealing connector comprises a sink portion recessed towards the outside, and two lap-jointing hinges located on both sides of the sink portion and connected with the side wall sealing layer unit plates adjacent thereto respectively, and the sink portion is embedded in the corresponding recess formed in the side wall base layer.

25. The storage container of claim 1, wherein the storage container comprises a top wall, which comprises a top wall base layer and a top wall sealing layer covering a bottom side of the top wall base layer, the top wall sealing layer comprising:

a top wall central section;
        at least one top wall annular section disposed around the top wall central section, each of the at least one top wall annular section comprising:
    a plurality of top wall first sealing plates and a plurality of top wall second sealing plates alternately arranged in the circumferential direction, wherein the top wall first sealing plates have a circumferential size gradually reduced in the radially inward direction, and the top wall second sealing plates have a circumferential size gradually expanded in the radially inward direction; and
    top wall first sealing connectors disposed between and fixing the adjacent top wall first sealing plates and top wall second sealing plates on the top wall base layer.

26. The storage container of claim 1, wherein the storage container is a liquefied gas storage container for marine equipment or a land-based device for cryogenic frozen liquid.

* * * * *